Nov. 16, 1937.  J. M. BANDISH  2,098,992
PACKING
Filed Jan. 14, 1935  2 Sheets-Sheet 1
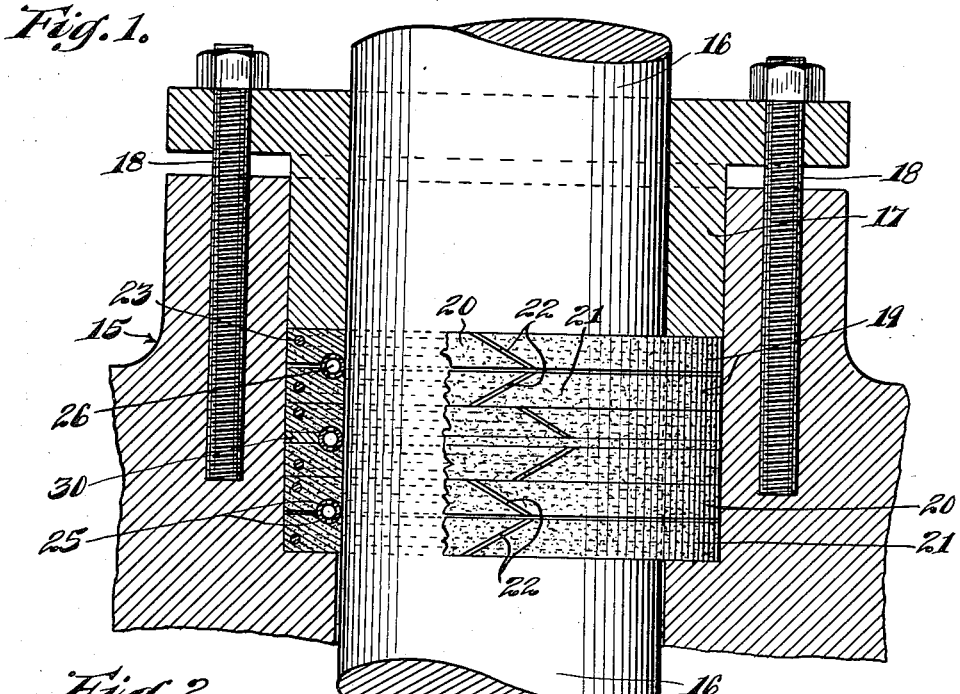
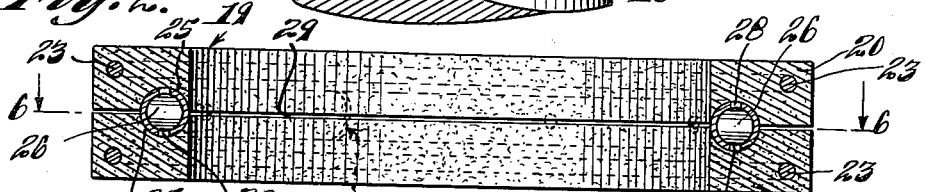
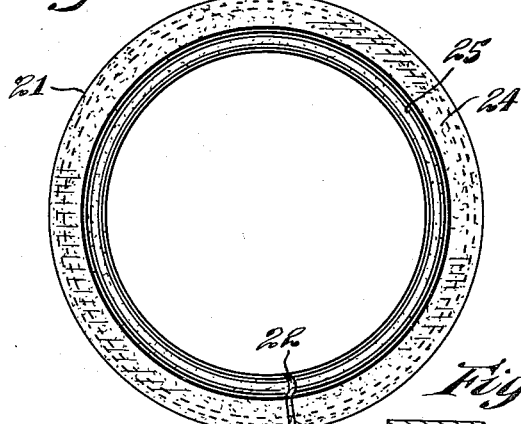
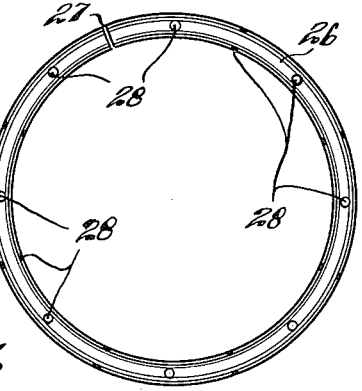
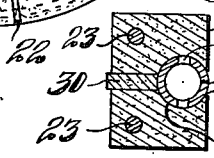
Inventor:
Joseph M. Bandish,
By Joshua R. H. Potts
his Attorney.

Nov. 16, 1937.    J. M. BANDISH    2,098,992
PACKING
Filed Jan. 14, 1935    2 Sheets-Sheet 2
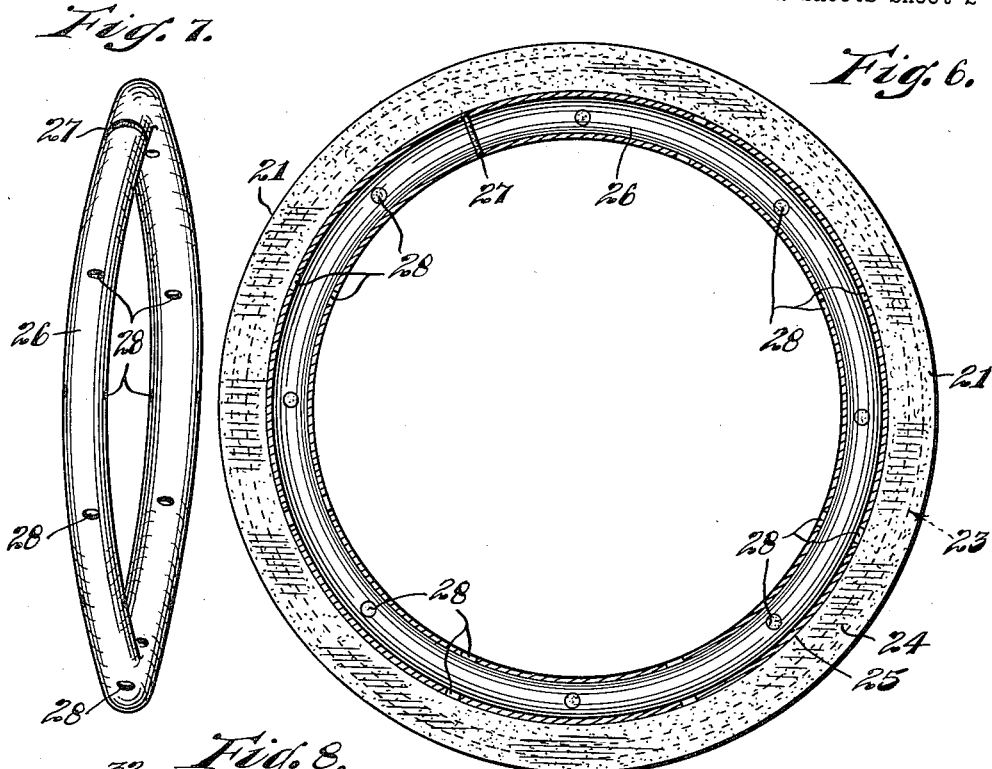
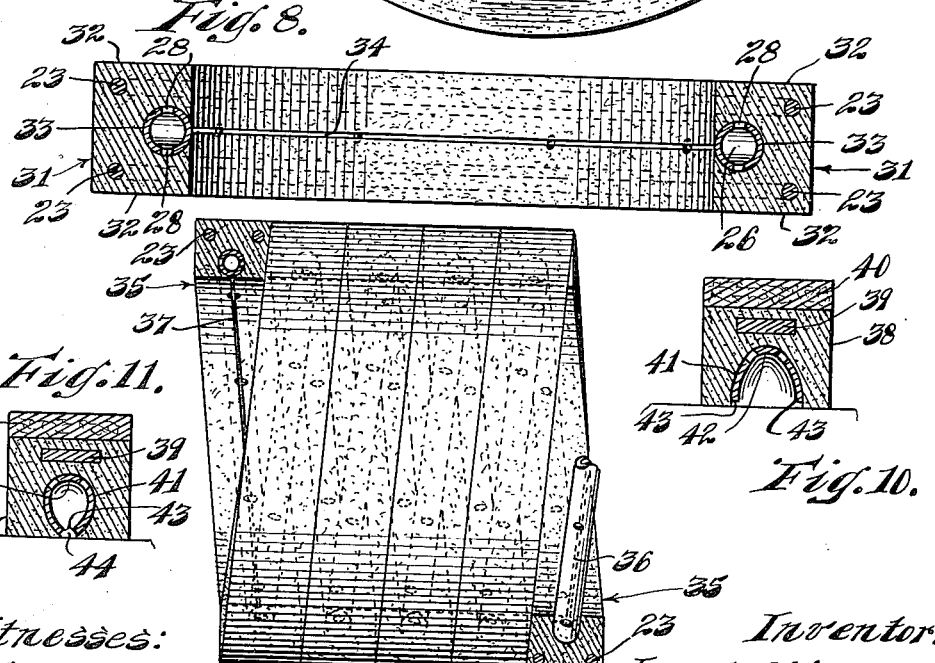
Witnesses:
C. E. Wessels
Aasta E. Matsen
Inventor:
Joseph M. Bandish,
By Joshua R. H. Potts
his Attorney.

Patented Nov. 16, 1937

2,098,992

UNITED STATES PATENT OFFICE 2,098,992

PACKING

Joseph M. Bandish, Chicago, Ill.

Application January 14, 1935, Serial No. 1,658

4 Claims. (Cl. 288—1)

This invention relates to improvements in packing and relates particularly to packing for high temperature oils and centrifugal or reciprocating pumps and valves for oils, liquids, and gases at high temperatures, for example in high temperature cracking processes. The invention not only has for an object advantages in respect to elimination of abrading, but also has for an object the elimination of emergencies due to expansion under high heats, e. g. in refining, and causing damage to the shaft or rod and other parts, as will appear more fully hereinafter.

Among other objects of my invention, it has been an object to provide packing efficacious as aforesaid, but such packing which can be made inexpensively and in convenient forms, such as rings or lengths for use as desired.

My invention may be clearly understood from the following specification and drawings, in which:

Fig. 1 is a sectional view of a stuffing box showing a shaft or piston rod with packing rings of my invention shown applied, with the rings partly in section and partly in elevation;

Fig. 2 is a sectional view of one form of packing ring of my invention, the same being a composite ring composed of a pair of complementary ring sections and other elements;

Fig. 3 is a plan view of one of said sections showing the groove of said section;

Fig. 4 is a plan view of the ring tube adapted to be used with my packing ring;

Fig. 5 is a sectional view of a modified form of packing ring;

Fig. 6 is a plan view taken on the line 6—6 of Fig. 2 showing the tube in section, fitted to a ring section;

Fig. 7 is a detail view of my ring tube;

Fig. 8 is a sectional view of a modified form of my invention showing an integral ring;

Fig. 9 is a modified form of the ring of my invention, the same being a spiral form;

Fig. 10 is a sectional view of a modified form of ring and tube before the same is applied to a shaft or rod; and Fig. 11 is a sectional view similar to that of Fig. 10 showing the ring after being applied to a rod or shaft.

Referring to Fig. 1, there is shown a preferred form of my invention selected for purposes of illustrating the principle of my invention. In a stuffing box 15 there are located a piston rod 16 and a gland 17 with screw bolts 18 for locking the gland to the stuffing box, as will be readily understood. Shown in the stuffing box mounted around the rod 16 are a plurality of composite rings 19, each ring having two sections 20 and 21. Three rings 19 are shown in Fig. 1. The outer two of these three rings are similar to the composite rings shown in Fig. 2. The central ring is somewhat different in construction, as will be pointed out hereinafter.

As will be apparent from Fig. 2, each of the sections 20 and 21 of each ring is more or less cylindrical in form and is provided with a bias cut 22, which cuts may be staggered entirely or in pairs or as desired, when the rings are applied to the rod. I have provided each section 20 and 21 with asbestos cores 23 which, however, may be eliminated, as the cores are not indispensable to my invention. The sections 20 and 21 have flat surfaces 24. Each section on one side is provided with a groove 25 adapted to receive substantially one-half of a tube 26 which is split as at 27 and provided with a plurality of perforations 28. As stated, each composite ring is made of the pair of sections 20 and 21, and the sections are positioned so that the grooves 25 lie adjacent each other and complement each other to form an almost circular groove so as to almost entirely contain the tube 26 when the sections are placed together. When placed together the sections will have an oil opening 29 as the packing edges will not completely meet to prevent oil from entering the tube 26 and the groove.

In Fig. 5 I have shown a modified form of composite ring which is the same arrangement generally as in Fig. 2, except that an asbestos seal 30 is provided. This ring is shown in position as the central composite ring in Fig. 1. The asbestos seal will act to serve as an additional seal between the packing and the stuffing box wall and will also serve to space the sections of the packing ring to prevent undue pressure on the tube if such should occur, depending on the materials used and circumstances.

In Fig. 8 I have shown a modified form of packing ring which is generally the same as that shown in Fig. 2, except that instead of being a composite ring member of two sections, the ring is an integral ring 31 provided with similar cores 23, flat faces 32, and an almost complete cylindrical groove 33 adapted to receive a tube 26. By this arrangement an oil opening 34 is provided to permit oil to enter the tube and groove.

In Fig. 9 I have shown another modified form. This shows instead of one complete, continuous ring, as shown in Fig. 8, a ring generally otherwise the same as that shown in Fig. 8 made up in a spiral 35. This ring is integral, that is, in the form shown it is not made of complementary sections like the ring in Fig. 2, although it may be so made, and is provided with a continuous spiral, a spiral asbestos core, and a spiral groove which is almost completely cylindrical, adapted to receive a spiral perforated tube 36. It will be readily understood that instead of making the packing in ring form as in Fig. 8, for example, the packing may be made in straight strips or lengths, with the tube 26 as a straight tube or a length of straight tubing instead of in circular form. The spiral form may easily be made from such straight strips or lengths of packing and tubing by fitting the straight tubing to the bore of the length of packing and feeding the whole to a mandrel from which it may be produced in spiral form, as will be manifest to those skilled in the art. Other methods, of course, may be used in production.

In Fig. 10 I have shown a modified form in cross section involving an integral ring of packing 38 having an internal rectangular asbestos core and an external asbestos sealing band 40. This sealing band 40 will not only function to seal between the stuffing box and the packing, but will also serve as a cushion to allow for misconformity or misalignment between the shaft and the packing, as will be readily understood. The ring 38 is provided with a circular groove 41, semi-elliptical in cross section, and fitted into the groove is a split, circular, perforated tube 42 which is also more or less semi-elliptical in cross section. The tube 42 may be evolved from a tube 46 by splitting the same to form ends or legs 43 which may be pulled apart and held in the pulled-apart condition by the flexible and resilient ring 38.

Fig. 10 shows a ring of the modified form before the same is applied to a rod or shaft and shows the ends 43 raised out of potential contact with the rod or shaft. Fig. 11 shows the same structure after the ring has been applied to a shaft and the gland locked in position.

As shown in Fig. 11 the ends 43 of the tube 42 have been bent toward each other as at 44 so as to give the tube 42 a more cylindrical appearance. This will result from the lateral pressure exerted by the gland when it is compressed in place as will be manifest to those familiar with the art, and in this condition under compression there will be at most only a minute or edge-line contact between the tube 42 and the rod 16. It will be seen that this ring 38 will have an oil opening like the other rings to admit oil to the tube and groove.

The packing ring proper may be made preferably of metal and preferably of a foil such as aluminum or alloy foil as a base. In addition there is employed a mineral or vegetable oil such as castor oil or soy bean oil, and a lubricant, preferably a semi-solid lubricant, nonsoluble in gasoline, such as aluminum or graphite. The aluminum or graphite, for example, may be used in powdered form. The tube may be made of aluminum or some other such material which has proved itself highly resistant to corrosive effects of oil.

In my preferred form I use aluminum foil in sheets which are crinkled and fed into a bath of castor oil and graphite flakes heated to the boiling point. After the foil has been properly treated it may be left to dry and compressed into ropes or otherwise as desired by hand or machine, and thereafter compressed into ring form. A bath made up of ten gallons of oil and one pound of graphite flakes has been found to give highly efficient results. As indicated, the packing may be made into integral complete rings or sections of rings or in lengths and sold in lengths. When sold, for example, in lengths or in spiral form, they may cut off as much as is desired for this purpose, as will be manifest.

The packing of my invention will not only be highly advantageous in respect to frictional abrading between packing and shaft but is particularly advantageous in connection with high temperature oils and centrifugal or reciprocating pumps and valves working oils, liquids, and gases at high temperatures. It is particularly useful in preventing frictional abrading and emergency injuries to a shaft and accompanying parts under high temperatures due to expansion. In the process of refining oil, for example, some of the oil is used for lubricating the shaft, and it is allowed to pass between the shaft and its packing. If oil were passing between the shaft and its packing in the process of refining, there would be no likelihood of any emergency occurring as long as the oil continued to pass. However, if, for example, the temperature of the oil increased from, say 700 to 1000 degrees, and the oil ceased to pass between the shaft and its packing, there might be a sufficiently great increase in expansion which would cause the packing to tighten against the shaft and particularly in the center of the shaft contacting face of the packing, as the temperature changes cause expansion faster at such points than around the seams of the packing. Such a condition has frequently resulted in costly injury to shafts and apparatus.

In the use of my packing when oil increases in temperature and ceases to flow between the shaft and the packing units described in the present structure, there will in the first place be oil contained in the perforate tube which in all probability will be sufficient to prevent any injury as long as the ordinary emergency lasts. However, if the amount of oil in the ring is not sufficient, the expansion will find an outlet in the groove, in the perforated tube, and in the space inside the tube, and abrading due to expansion will be reduced.

It will also be seen that asbestos cores, while not indispensable to the use of the packing, may be used to supplement the packing to act as a cushion as aforesaid. In my device the use of cooling lanterns or glands may be eliminated or may be used if desired. It will be understood also that the packing of my invention is useful in connection with sleeves for shafts where sleeves are used between the packing and the shaft.

It will also be seen that an oil opening will be maintained to admit the proper film of oil into the groove of the ring and thence through the perforations into the tube contained in the groove, and that any contact between the tube and a shaft, for example, will be a minimum and non-injurious. In packing much depends on the preservation of a film of oil of the proper thinness. By employing the rings of my invention and securing them in place under the proper compression, the same will be found to accomplish radically new results in eliminating abrading and emergencies such as described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A packing having a substantially flat inner edge portion, a bore in said packing along said edge portion, and a hollow tube in said bore having a plurality of apertures in the side walls thereof, a number of said apertures being adapted to communicate with the interior of said packing, there being a slit in said packing between said bore and said inner edge, some of said apertures being adapted to communicate with said slit.

2. A packing having a substantially flat inner edge portion, a bore in said packing along said edge portion, and a hollow tube in said bore having a plurality of apertures in the side walls thereof, a number of said apertures being adapted to communicate with the interior of said packing, there being a continuous slit in said packing between said bore and said inner edge, some of said apertures being adapted to communicate with said slit.

3. A packing comprising a pair of sections having mutually opposing surfaces, said surfaces each having a grooved portion and a flat portion, a tubular member having apertures, and a filler strip of asbestos between said flat surface portions, said grooved portions together being adapted to retain said tubular member therebetween.

4. A packing comprising a pair of sections having mutually opposing surfaces, said surfaces each having a grooved portion adjacent an edge thereof and a flat portion, a tubular member having apertures, and a filler strip of asbestos between said flat surface portions, said grooved portions together being adapted to retain said tubular member therebetween.

JOSEPH M. BANDISH.